(12) United States Patent
Southwell et al.

(10) Patent No.: US 6,959,363 B2
(45) Date of Patent: Oct. 25, 2005

(54) CACHE MEMORY OPERATION

(75) Inventors: Trefor Southwell, Bristol (GB); Peter Hedinger, Bristol (GB)

(73) Assignee: STMicroelectronics Limited, Bristol (GB)

( * ) Notice: Subject to any disclaimer, the term of this patent is extended or adjusted under 35 U.S.C. 154(b) by 199 days.

(21) Appl. No.: 10/278,772

(22) Filed: Oct. 22, 2002

(65) Prior Publication Data

US 2004/0030839 A1 Feb. 12, 2004

(30) Foreign Application Priority Data

Oct. 22, 2001 (EP) .............................................. 01308961

(51) Int. Cl.$^7$ .............................................. G06F 12/00
(52) U.S. Cl. ........................ 711/137; 711/128; 711/134; 711/144; 711/145
(58) Field of Search ................................ 711/137, 128, 711/133, 134, 144, 145; 712/207

(56) References Cited

U.S. PATENT DOCUMENTS

| | | | |
|---|---|---|---|
| 5,499,355 A | * | 3/1996 | Krishnamohan et al. .... 711/137 |
| 5,600,817 A | | 2/1997 | Macon, Jr. et al. ......... 395/464 |
| 5,649,144 A | | 7/1997 | Gostin et al. ............ 395/421.1 |
| 6,134,643 A | * | 10/2000 | Kedem et al. .............. 711/213 |
| 6,138,213 A | * | 10/2000 | McMinn ..................... 711/137 |
| 6,292,871 B1 | * | 9/2001 | Fuente ....................... 711/136 |
| 6,523,093 B1 | * | 2/2003 | Bogin et al. ................ 711/137 |
| 2002/0087802 A1 | * | 7/2002 | Al-Dajani et al. .......... 711/137 |
| 2003/0033488 A1 | * | 2/2003 | Gruner et al. .............. 711/145 |
| 2004/0049640 A1 | * | 3/2004 | So et al. ..................... 711/137 |

* cited by examiner

Primary Examiner—Brian R. Peugh
(74) Attorney, Agent, or Firm—Lisa K. Jorgenson; Dennis M. de Guzman; Seed IP Law Group PLLC

(57) ABSTRACT

A cache memory comprises a fetch engine arranged to issue fetch requests for accessing data items from locations in a main memory identified by access addresses in a program being executed, a pre-fetch engine controlled to issue pre-fetch requests for speculatively accessing pre-fetch data items from locations in said main memory identified by addresses which are determined as being a number of locations from respective ones of said access addresses, and a calibrator arranged to selectively vary said number of locations.

36 Claims, 3 Drawing Sheets

Address

CACHE MEMORY OPERATION

BACKGROUND OF THE INVENTION

1. Field of the Invention

The present disclosure relates generally to a cache memory, and in particular but not exclusively, relates to its ability to deal with pre-fetch requests, and to methods of dealing with pre-fetch requests.

2. Description of the Related Art

It is known in the art to provide a cache memory as a level of memory hierarchy between a central processing unit CPU or other main processor or memory master, and a main memory (or other memory-mapped device). A cache memory duplicates commonly-used locations in a main memory for the purpose of speeding up accesses to these locations. In general it stores the most recently used instructions or data from the larger but slower main memory. This means that when the CPU wishes to access data, the access request can be made to the cache instead of to the main memory. This takes far less time than an access to a main memory, thus the CPU can read or write data more quickly and consequently runs more efficiently than if a cache memory were not used. The cache also updates the main memory with the duplicated locations when required, explicitly or implicitly.

Since computer programs frequently use a subset of instructions or data repeatedly, the cache is a cost effective method of enhancing the memory system in a "statistical" method, without having to resort to the expense of making all of the memory system faster. Currently the gap between CPU and memory clocks is widening. For example a 1.2 Ghz Athlon may only have a 133 Mhz memory system making caching even more important.

The cache is usually smaller than the main memory, which means that it cannot provide a duplicate of every location. Therefore, when an access request in the form of an address is made to the cache, it needs to determine if that particular location currently being requested is one of those duplicated locally or whether it needs to be fetched from the main memory, i.e., it performs a "tag compare" to see if that item of data is present in the cache. If the location is already stored in the cache, the access is termed a "hit" and if it is not it is termed a "miss". The determining of whether an access is a hit or a miss takes an amount of time, $t_{hit}$. This time is normally the main factor in the amount of time that the cache takes to return a frequently used location and since speed is the purpose of such operations, this is designed to be as short as possible.

If the data is present ("hit") it is returned quickly to the requesting CPU or suchlike, if however the item is not found ("miss") then it is fetched from the main memory and stored into the cache.

When a cacheable request enters the cache, the address of the request is split into three fields. These are the tag, the line and the word fields. The tag field is the top part of the address that is compared with the addresses stored in the cache to determine whether the request is a hit or a miss. The line field is the part of the address that is used to locate the tag and data in a RAM array within the cache memory. The line is a collection of words, all of which are moved in and out of the cache at once. Thus the tag field shows for which location in memory the data for a given line is cached. The word field is the part of the address that specifies which word within a line is being accessed.

The line field is used to address two RAM arrays within the cache memory, one of which contains data (the data RAM) and the other of which contains tags (the tag RAM). In order to determine whether the request is a hit or a miss, the line field of the request is looked up so that the one or more tags in the tag RAM associated with that line can each be compared with the tag of the request. If the memory location shown by the tag in the tag RAM and the memory location shown by the tag of the request match, the request is a hit. If they do not match, the request is a miss.

Within the tag RAM, each tag location has a bit called "valid". If this bit is set low, the tag of the tag RAM is ignored because this bit indicates that there is no data in the cache for the line associated with the tag. On the other hand, if a tag is stored in the cache for that line, the line is valid. The valid bit is set low for all tag locations within the tag RAM by, for example, a reset of the cache. In a write back cache, each tag location also contains a "dirty" bit. This dirty bit is set when the line is written to in response to a request from the CPU or suchlike. This line is then termed a "dirty line". When a dirty line is replaced with new data, its contents must be written back to the main memory so as to preserve coherency between the cache and the main memory. The dirty bit is then reset.

Normally when an access is made to the cache, and the data is not already present (a miss) a stall occurs until the line can be filled from the main memory. Clearly this has a negative impact on the efficient running of the program. Increasing the size of the cache or the size of each line can reduce the number of cache misses and hence the number of stalls, because data corresponding to a larger number of addresses in the main memory can be stored at any one time in the cache. There is however a minimum number of misses that the cache can not avoid (termed "compulsory misses") because that line has never been accessed before.

A cache miss can be classified as one of the following types:

(i) Compulsory Misses

If the data has never been accessed before then it will not be present in the cache. In this case the miss is classified as "compulsory".

(ii) Capacity Misses

As a cache is of a finite size eventually old data will have to be replaced with new data. If the data requested from the cache would have been available in an infinite sized cache then the miss is classified as "capacity".

(iii) Conflict Misses

A cache is made up of one or more banks. When an address is presented to the cache it uses some of the address bits to determine which row to look in. It then searches this row to see if any of the banks contain the data it requires, by matching the tags. This type of miss can be understood by considering the common organizational types of cache, as follows.

A cache memory is usually organized as one of three types. The first type is a direct-mapped cache in which each location in the cache corresponds to one location in the main memory. However, since the cache memory is smaller than the main memory, not every address in the main memory will have a corresponding address mapped in the cache memory. The second type is a fully-associative cache in which data is stored in any location in the cache together with all or part of its memory address. Data can be removed to make space for data in a different location in the main memory which has not yet been stored. The third type is an n-way associative cache, essentially a combination of the first and second types.

When a request is made to a fully associative cache, the whole cache is searched to see if the data is present, as if the cache had only one row but a large number of banks. A conflict miss in a different type of cache occurs when the requested data would have been present in a fully associative cache but is not present in the actual cache. In this case the data must have been discarded due to a bank conflict. That is, for a particular row more items of data need to be stored than there are banks available.

It would be desirable to provide a scheme which allows the cache to predict what data will be required next and thus reduce the number of compulsory misses to a minimum.

It is well known that most data access patterns have locality of reference. That is, if a particular address is accessed then there is a high probability that another location nearby will also be required. For example, certain applications (such as an MPEG decoder) tend to read their input in a stream, perform some computation and produce an output stream. In other words, they have sequential data access patterns. Sequential data access patterns have a high locality of reference because they always access the next adjacent location.

Given the locality of reference often present when executing programs, one known way to exploit the locality of reference is to have a cache line that is larger than a single data word. In this way when a data word is accessed its neighbors are also fetched into the cache. As the cache line gets larger there is a greater chance of exploiting the locality of reference. The disadvantage of making the cache line too big is that the number of cache conflicts increases and the miss penalty is made larger. In other words, if the line is too big, most of the data fetched is not required and therefore the cache becomes inefficient. Fetching more data also increases the bandwidth demand on the main memory system.

An alternative to increasing the cache line size is to pre-fetch data. This means the cache predicts what data is required next and fetches it before it is requested. One known system is that of application/compiler driven pre-fetching. In such a software driven pre-fetch scheme the assembler code contains instructions/hints that let the cache know it should ensure the specified data is in the cache. This means the cache can start fetching the data before it is required and thus reduce the number of stalls. While this scheme should work in theory, in practice it does not always perform as well as is expected. The main reason for this is that memory latencies are large. For example 30 cycles would not be an uncommon cache fill time. If the application wished to prevent a cache stall it would therefore have to issue a pre-fetch 30 cycles before the data is required. Assuming use of a modern processor that can issue up to four instructions per cycle this would imply the pre-fetch would have to be placed up to 120 instructions in advance, Performing a pre-fetch this far in advance is very hard to achieve.

The second problem arising in such a system is that pre-fetch instructions consume instruction bandwidth and potential issue slots. This means each pre-fetch instruction is taking up a slot that could be performing computation. It is possible that adding pre-fetch instructions will actually slow down an application. Another known scheme to pre-fetch data by exploiting locality of reference is to fetch a number of lines ahead. This scheme is known as fixed distance pre-fetch. In this scheme, when line 'N' is accessed as a result of a fetch request to the cache, the cache then pre-fetches line 'N+d' (where d is the pre-fetch distance), if it is not already present in the cache. For this scheme to work efficiently the cache must support up to 'd' outstanding memory requests and the value of 'd' needs to be set to such a value as to overcome the memory latency. For example if it takes 32 cycles to fetch a 16 byte cache line from memory and the processor can read one four byte data word per cycle then 'd' should be set to 8 (d=cycles/(linesize/datasize)=32/(16/4)).

The biggest problem with this fixed distance pre-fetch scheme is knowing what to set 'd' to. If it is too small then the pre-fetch will not prevent the processor from stalling on the cache. If it is too large then the cache will pre-fetch too much data causing extra bus bandwidth and potentially discarding useful data from the cache.

BRIEF SUMMARY OF THE INVENTION

It would be desirable to provide a pre-fetch scheme that mitigates the problems of the prior art. Ideally such a scheme would minimize stalling as a result of compulsory misses and would prevent discarding of potentially useful data from the cache.

According to a first aspect of the present invention, there is provided a cache memory comprising:

a fetch engine arranged to issue fetch requests for accessing data items from locations in a main memory identified by access addresses in a program being executed;

a pre-fetch engine controlled to issue pre-fetch requests for speculatively accessing pre-fetch data items from locations in said main memory identified by addresses which are determined as being a number of locations from respective ones of said access addresses; and a calibrator arranged to selectively vary said number of locations.

The cache memory further comprises a storage device having an accessible storage area for holding data items and pre-fetch data items, and the cache memory is arranged to store the said data items and pre-fetch data items in the accessible storage area of the storage device. It would alternatively be possible to provide separate storage areas for data items and pre-fetch data items.

Conveniently the calibrator selectively varies the said number of locations at regular time intervals. Suitably the calibrator comprises: a used pre-fetch counter arranged to, during a given time interval, count a first number of pre-fetched data items accessed from the second storage area of the storage device; a discarded pre-fetch counter arranged to, during the said given time interval, count a second number of pre-fetched data items not accessed from the second storage area and subsequently overwritten by storage of another data item or pre-fetch data item; a ratio calculator arranged to calculate the ratio of the second number to the first number, a comparator arranged to compare the calculated ratio to a pre-determined value; and an optimizer arranged to, if the calculated ratio is more than the pre-determined value, decrease the number of locations, and otherwise to increase the number of locations up to a predetermined maximum value. Suitably the said pre-determined maximum value is the number of issued fetch requests that have not returned from the main memory. Such requests are known as "outstanding" memory fetches.

If the calculated ratio is more than a pre-determined upper limit, the optimizer is arranged to set the number of locations to one.

The pre-fetch engine is further controlled not to access any data items that are already present in the storage device.

The cache memory may further comprise a write buffer for holding data items and the pre-fetch engine may be controlled not to pre-fetch a data item that is present in the write buffer.

In one embodiment of the invention the cache memory is a set associative cache having N rows and comprising a busy bit for each row for indicating that the row is occupied with a pre-fetched data item. In this case the cache memory can be arranged to, before a pre-fetch data item is accessed from the main memory, set the busy bit for a row, thus preventing that row from being used to store any other pre-fetch data items, and when the pre-fetched data item has been accessed, to store it in that row and to re-set the busy bit.

The cache memory further comprises a tag array that receives pre-fetch requests, the tag array having a plurality of sections and being arranged to allocate a section to each said pre-fetch request before forwarding the request to the main memory. The allocated section can comprise a tag indicating the address in the second area of the storage device in which the data item being accessed from the main memory in accordance with each pre-fetch request is to be stored, a transaction ID and a flag associated with the pre-fetch data item. In this case, when the pre-fetch data item has been accessed from the main memory, it can pass to the tag array, wherein its transaction ID is looked up to point to its tag, and wherein it is stored together with the said flag in the address indicated by the tag, so that the storage device knows that it is a pre-fetch data item. When the said data item is accessed from the storage device, the said flag can be re-set and a signal can be sent to the used pre-fetch counter to cause it to increment. If, on the other hand, the said data item is not accessed from the storage device and is subsequently overwritten by storage of another data item or pre-fetch data item, the status of the said flag can be checked and if it is found to be set, a signal can be sent to the discarded pre-fetch counter to cause it to increment.

It is possible for the pre-fetch engine to be controlled by a computer program arranged to override the calibrator.

The cache memory further comprises a controller arranged to selectively discard issued pre-fetch requests.

According to a second aspect of the present invention, there is provided a cache memory comprising:

a pre-fetch issuer arranged to issue pre-fetch requests;

a controller arranged to selectively discard issued pre-fetch requests;

a pre-fetch engine arranged to access pre-fetch data items at locations in a main memory in accordance with issued pre-fetch requests that have not been discarded.

According to a third aspect of the present invention, there is provided a method of controlling a cache memory, the method comprising:

issuing fetch requests for accessing data items from locations in a main memory identified by access addresses in a program being executed;

issuing pre-fetch requests for speculatively accessing pre-fetch data items from locations in said main memory identified by addresses which are determined as being a number of locations from respective ones of said access addresses; and selectively varying said number of locations.

According to a fourth aspect of the present invention, there is provided a system comprising:

a central processing unit configured to execute a program;

a main memory; and a cache memory arranged between the central processing unit and the main memory, the cache memory comprising:

a fetch engine arranged to issue fetch requests for accessing data items from locations in a main memory identified by access addresses in the program being executed;

a pre-fetch engine controlled to issue pre-fetch requests for speculatively accessing pre-fetch data items from locations in said main memory identified by addresses which are determined as being a number of locations from respective ones of said access addresses; and a calibrator arranged to selectively vary said number of locations.

According to a fifth aspect of the present invention, there is provided a system comprising:

a main memory; and a cache memory connected for communication with the main memory, the cache memory comprising:

a pre-fetch issuer arranged to issue pre-fetch requests;

a controller arranged to selectively discard issued pre-fetch requests; and a pre-fetch engine arranged to access pre-fetch data items at locations in the main memory in accordance with issued pre-fetch requests that have not been discarded.

BRIEF DESCRIPTION OF THE SEVERAL VIEWS OF THE DRAWING(S)

Embodiments of the invention will now be described, by way of example only, with reference to the accompanying drawings in which.

In the figures, like reference numerals indicate like parts.

DETAILED DESCRIPTION OF THE INVENTION

Embodiments for cache memory operation are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
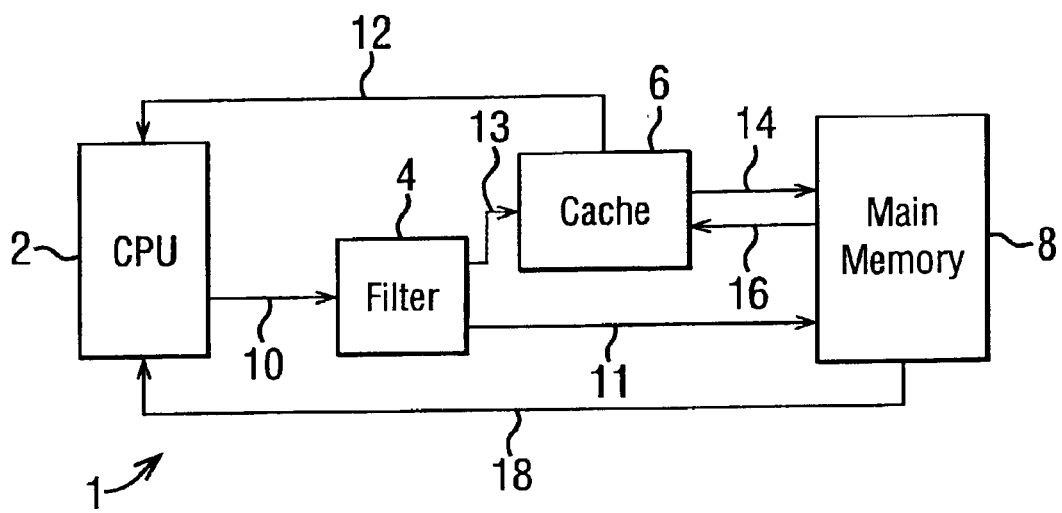
FIG. 1 is a schematic diagram of a cache memory used together with a CPU and a main memory.

FIG. 1 shows a system, indicated generally by reference numeral 1, that is executing a computer program and is capable of executing a number of such programs. The system comprises a CPU 2, a filter 4, a cache memory 6 and a main memory 8. The system is controlled by a clock pulse.

In operation, the CPU 2 sends out a request 10, which initially passes to the filter 4. During the first clock pulse after the request 10 is sent out, the filter 4 determines whether the requested data is to be cached. This decision is taken with the aim of not caching areas of memory that may change or are otherwise defined as non-cacheable, and may depend on how frequently the address is likely to be accessed. If it is decided that it is not to be cached, the request bypasses the cache memory 6 and is passed directly to the main memory 8 as shown by arrow 11. The main memory 8 can then read/write the data and return a message to the CPU indicating that this has been done, as shown by arrow 18.

If, on the other hand, the filter 4 decides that the data is to be cached, it passes the request on to the cache memory 6, as shown by arrow 13. During the second clock pulse after the request 10 is sent out, the cache 6 determines whether or not the request is to an address already duplicated in the cache 6, that is whether it is a hit or a miss. If it is a hit, the request is returned to the CPU 2, as shown by arrow 12. If the request is a miss, a signal 14 is sent to main memory 8, and the data is retrieved, as indicated by arrow 16. The data is stored in the cache, usually by overwriting existing data. The existing line, prior to overwrite, may be dirty and if so, is written back to main memory 8 before the new data overwrites it. A signal is then sent back to the CPU, to inform it that the data has been fetched. At some point soon afterwards, when convenient, the cache memory 6 updates the main memory 8 to reinstate coherency between the address in the cache and the address in the main memory of the newly-stored data. The stored data is thus available for use by the CPU 2.

Figure 2:
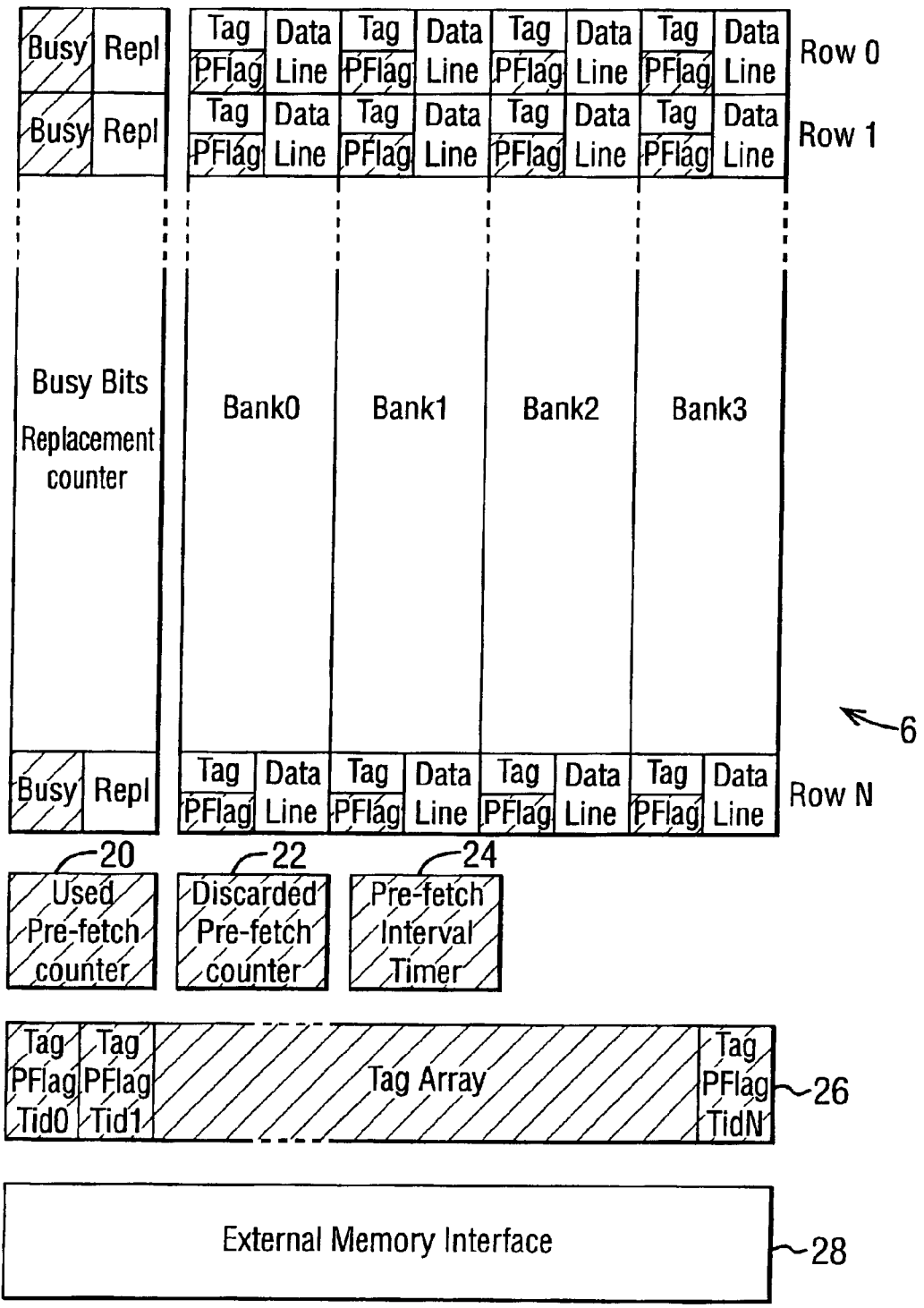
FIG. 2 shows an architecture of a cache memory of one embodiment of the invention.

FIG. 2 shows schematically the internal structure of cache memory 6. Cache 6 is a four way set associative cache, which means it has four banks, shown as Bank0, Bank1, Bank2 and Bank3. Each bank has a Tag and a Data Line per row. The Data Lines are more usually known just as "lines" of the cache. The rows are labeled Row 0, Row 1 . . . Row N, and it can be seen that these are commonly addressed across all four banks. In other words, for the purposes of the diagram and for understanding the operative layout of the cache, the cache 6 is divided horizontally into four banks and vertically into N rows. Thus each row contains four cache entries, one for each bank, hence allowing four cache entries for one row address. When data needs to be fetched from main memory 8 (due to a miss), it is loaded into the correct row in one of the banks, in accordance with a refill algorithm which is based on, for example, how long a particular item has been held in the cache, or other program parameters of the system. The replacement algorithm is chosen from those known in the art and is not described further here.

The cache 6 also has one Busy bit and one replacement counter (Repl) per row, shown to the left of the four banks. The replacement counter is used to determine which bank of the correct row will be replaced next. The function of the Busy bit will be described below.

There are also provided a 16-bit used pre-fetch counter 20, a 16-bit discarded pre-fetch counter 22 and a pre-fetch interval timer 24, shown at the bottom of the banks. Also provided is a tag array 26, divided into sections, each section corresponding to a request to the cache 6. Each section holds a tag, a Pflag and a transaction ID (Tid0, Tid1 . . . TidN). Use of these parameters will be described below.

Finally, there is an external memory interface 28, connected via a bus to main memory 8. This provides an interface between the cache 6 and main memory 8.

In use, cache 6 receives a request from CPU 2 (i.e., a request that the filter 4 has decided should be cached), as described with reference to FIG. 1.

In order to support multiple outstanding pre-fetch requests the cache 6 must support multiple outstanding bus requests. In order to achieve this it uses the Busy bit per row and tag array 26, as will be described with reference to FIG. 3.

Figure 3:
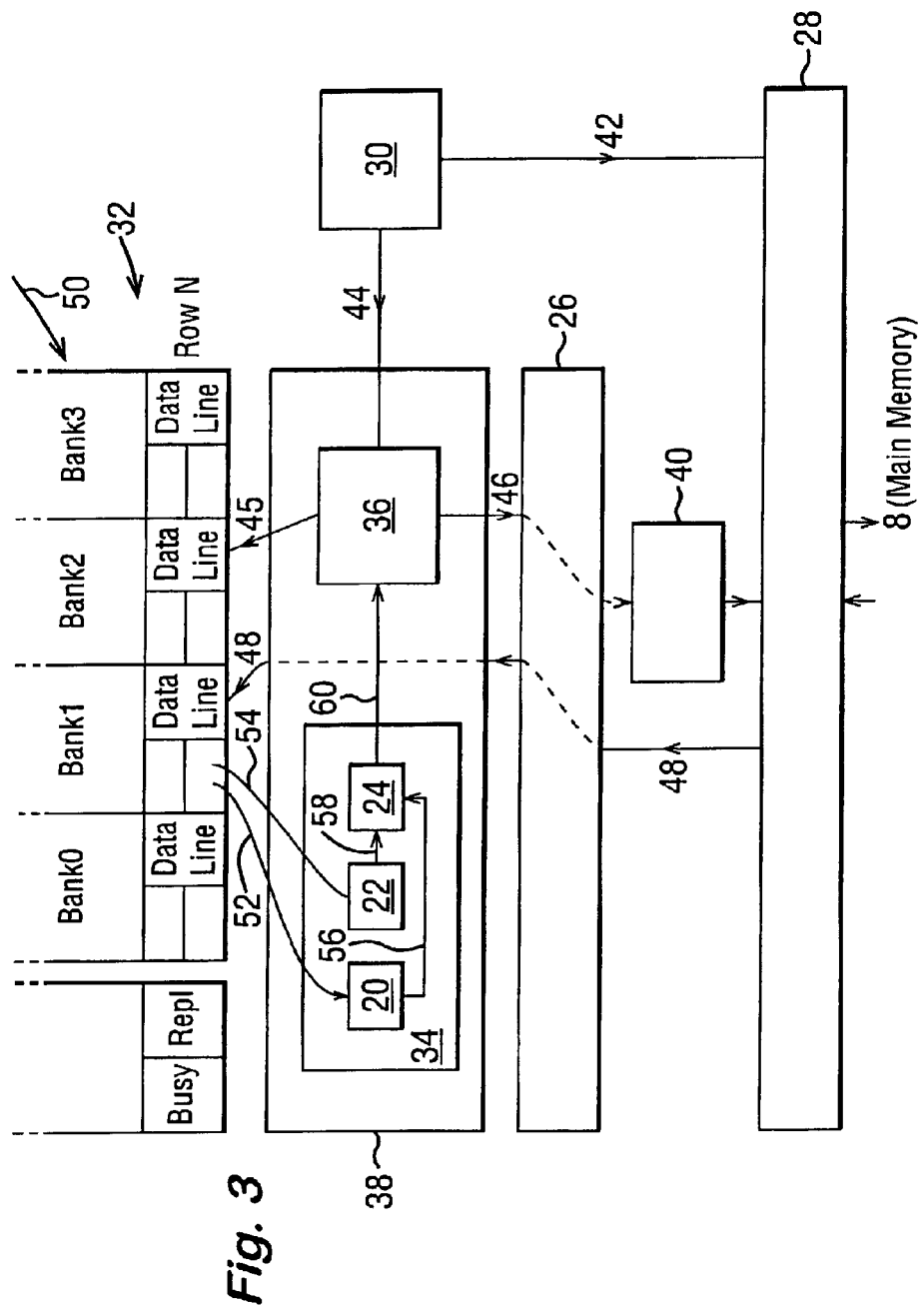
FIG. 3 shows a detail of parts of FIG. 2.

Referring now to FIG. 3, there are shown some parts of FIG. 2, together with some extra schematic parts which will be used to explain the functioning of the cache memory 6. The four banks and the Busy bits/replacement counter are indicated generally with reference numeral 32. This can be thought of generally as storage 32. A fetch engine 30 is also shown.

It can further be noted that the used pre-fetch counter 20, discarded pre-fetch counter 22 and pre-fetch interval timer 24 are all situated within a calibrator 34. There is also a pre-fetch issuer 36. Both calibrator 34 and pre-fetch issuer 36 form part of a cache controller 38. Finally, there is provided a pre-fetch engine 40, situated in between tag array 26 and external memory interface 28.

In operation, a request 13 is received from filter 4 and the cache 6 determines whether it is a hit or a miss. If it is a miss, the request is passed onto fetch engine 30 (this part of the process and the physical connections involved are not shown). Fetch engine 30 issues the fetch onto external memory interface 28, as shown by arrow 42. The fetch is then made from main memory 8 in the usual way. However, in this embodiment, information about the fetch, including the address in main memory 8, is also passed into cache controller 38 and, more specifically into pre-fetch issuer 36, as shown by arrow 44.

Pre-fetch issuer 36 then issues a pre-fetch request to an address in main memory 8. This address is controlled by the cache controller 34, as will be described below. This is passed onto storage 32, as indicated by arrow 45, wherein a cache line slot is allocated for the returning data. The cache line is marked as invalid, flushed if required, and the Busy bit is set. It should be noted that this can not happen within a cache line in which the Busy bit is already set. Thus this sequence allows a check to be made as to whether or not the Busy bit is set before a line is allocated to receive pre-fetched data. The pre-fetch request also passes to tag array 26, as indicated by arrow 46, wherein a Tid is allocated and the associated tag is stored in the tag array 26. The pre-fetch request is then passed onto pre-fetch engine 40, which issues the pre-fetch request onto the external memory interface 28. The pre-fetch address is passed to main memory 8, and the data from that address is returned via external memory interface 28, as indicated by arrow 48.

When the fetched data returns, its Tid is looked up in the tag array 26. The tag determines the previously-allocated location in the cache in which to store the returned data, and the data is then passed onto storage 32 (as shown by the continuation of arrow 48). In this embodiment the data passes via cache controller 34 but this need not be the case. The Busy bit is cleared and the data is stored in the previously-allocated cache line slot in storage 32. The tag array slot in tag array 26 is freed.

It should be noted that while the Busy bit is set for a particular line in cache 6, no further requests may be made to/from memory for that row. This stops spurious requests from being issued (more than one request for the same data)

because, as explained above, the pre-fetch issuer 36 effectively checks the Busy bit prior to issuing a pre-fetch request. The Busy bit being set also prevents thrashing (excessive overwriting of the line). In a set associative cache like the one of this embodiment, there is one Busy bit for the whole row, rather than one per line. This prevents multiple conflicting fetches from being issued and simplifies the design. It can be seen that the Busy bit is used as a way of remembering outstanding pre-fetches. In this embodiment, when it is set, it prevents fetches and pre-fetches to that line, but in other embodiments the Busy bit could, for example, prevent only pre-fetches. The concept of outstanding pre-fetches will be discussed further below.

In order to perform the above-described process in a manner that will assist efficient running of the program, a decision must be made as to the address from which to pre-fetch data relative to the address from which data is being fetched. In this embodiment, this difference is automatically and continually updated, as is described in the following. This difference is known as the "pre-fetch distance" and is indicated by the letter 'd'.

The reason that 'd' needs to be continually varied is that the most appropriate data to pre-fetch relative to the data being fetched varies with the program being executed and also with the particular part of the program being executed. The two most important factors are:

1. Whether the data being used by the CPU as it runs the program during a particular time period (i.e., a given number of clock cycles) is contiguous or whether it is stored in various non-contiguous locations within the main memory 8

2. How the data is being used by the CPU running the program, that is whether it uses it quickly and subsequently no longer needs it or whether it needs to retain the data being fetched for some time.

Another relevant factor in optimizing the value of 'd' is the congestion in the system 1. The memory 8 may be being used by other devices in addition to servicing the CPU. Such usage slows down the ability of the CPU to request and receive data and therefore impacts on the desirability of pre-fetching particular data because overall efficiency needs to be considered.

When a pre-fetch request is issued by the pre-fetch issuer 36 and sent to tag array 26 (arrow 46), in addition to the allocation of a Tid as described above, its entry into the tag array 26 is flagged by marking the Pflag in tag array 26 to show it is a pre-fetch request.

When the pre-fetch request is returned (arrow 48) the Pflag from the tag array 26 is copied to the Pflag for the cache line (described above with reference to FIG. 2). The setting of this flag enables the cache 6 to tell which cache lines were filled by pre-fetching. When the cache line is subsequently accessed (read/written to) by the CPU 2 (shown generally by arrow 50) the Pflag is cleared and the used pre-fetch counter is incremented. Thus arrow 52 shows a signal being sent from the storage 32 where the Pflag is stored to the used pre-fetch counter 20.

It is possible that data which has been pre-fetched and stored in the cache will not be used before it becomes necessary to overwrite if with new data. Therefore, when a cache line is overwritten its Pflag is checked. If the Pflag is set then it is counted as a discarded pre-fetch. Thus arrow 54 shows a signal being passed from storage 32 where the Pflag is stored to discarded pre-fetch counter 22, which consequently increments.

The pre-fetch interval timer 24 triggers a pre-fetch calibration based on the value of the two counters 20, 22. This calibration occurs at set time intervals, in this embodiment at 1 $\mu$s intervals. It therefore occurs at regular intervals after a given number of clack pulses. Since in this embodiment the clock speed is 1 ns, a calibration occurs every 1000 clock pulses. This figure could be chosen differently but it needs to be high enough that a meaningful number of increments of the counters can occur. In particular it may take a number of clock pulses before data is overwritten and hence the discarded pre-fetch counter 22 is incremented.

Thus every 1 $\mu$s the values of the two counters are passed to pre-fetch interval timer 24, as indicated by arrows 56 and 58 respectively. The pre-fetch interval timer 24 performs the calibration by calculating the ratio of discarded pre-fetches (counter 22) to used pre-fetches (counter 20). The first step in calculating this ratio is to divide the issued pre fetch counter by a power of 2 (say 8), this being implemented by dropping the last 3 (i.e., $\log_2(8)$) bits. This is effectively calculating a percentage of the number of issued pre-fetches. This divided value is then compared with the value of the discarded pre-fetch counter 22. Thus it can be ascertained if the number of discarded pre-fetches is higher or lower than a certain percentage of issued pre-fetches. If it is higher, it means that there have been too many discarded pre-fetches and thus that the pre-fetch distance 'd' is too high. If, on the other hand, it is lower than the certain percentage, it means that the pre-fetch distance 'd' is too low.

If it is ascertained that the pre-fetch distance 'd' is too high, pre-fetch interval timer 24 sends an instruction to pre-fetch issuer 36 to decrement 'd' for the next pre-fetch. This instruction is indicated by arrow 60. If, on the other hand, it is ascertained that the pre-fetch distance 'd' is too low, pre-fetch interval timer 24 sends an instruction to pre-fetch issuer 36 to increment 'd' for the next pre fetch. The increment or decrement can be by one address location or more than one address location. Thus calibrator 34 continually optimizes the distance 'd' ahead of the data being fetched from which data is pre-fetched. The new value of 'd' is used until the next calibration. Calibrator 24 could be programmable so that the target percentage could be varied depending on the program being run. It will be understood that the calibration interval (in this case 1000 clock cycles, as explained above) is low enough that the alteration of 'd' has a useful impact on running of the, program. As mentioned above, the optimal value of 'd' depends on the particular program being run and the particular part of the program being executed, and hence it must be updated at a suitable interval to take account of the nature of change of the program instructions. Calibrator 24 could also be programmable as to the calibration interval.

As a safeguard to assist in the optimization of 'd', if the ratio between discarded and used pre-fetches is very high, that is above a certain upper limit, then the pre-fetch distance is reset to 1. In practical terms this means that data from the location next to the fetch location is pre-fetched in the subsequent pre-fetch, and the following pre-fetches until the next calibration. This ensures that if things are going wrong then the automatic pre-fetch backs off quickly before it causes too many problems.

The pre-fetch distance is not allowed to be greater than the maximum number of outstanding memory fetches. The reason for this can be explained with reference to FIG. 4.

Figure 4:
FIG. 4 shows some memory addresses and associated pre-fetch addresses.

FIG. 4 shows a number of memory addresses 0–7. Data from addresses 0, 1 and 2 has been requested to be fetched and the current pre-fetch distance is 4. Therefore, when data from address 0 is fetched, this triggers a pre-fetch of data at address 4, and when data from address 1 is fetched, this triggers a pre-fetch of data at address 5. However, in this particular situation, there is some delay in dealing with the data being fetched and therefore the fetches to memory addresses 0, 1 and 2 are outstanding. Therefore, it becomes necessary to reduce the pre-fetch distance because if data at address 6 were fetched, the pre-fetch distance would be greater than the outstanding number of fetches (i.e., 4 is greater than 2), which would result in gaps in the data being fetched.

Thus the increment/decrement of 'd' only happens if it will remain within the predetermined range of more than 1 and less than the outstanding number of memory fetches.

At the end of a pre-fetch calibration period the two counters 20, 22 and the interval timer 24 are reset.

Thus it can be understood that the pre-fetch calibration keeps the number of discarded pre-fetches to a minimum by optimizing the pre-fetch distance. Furthermore, it ensures that a large percentage of the pre-fetched lines are actually used, which helps to reduce the number of cache conflicts. Thirdly it removes the requirement for the software to determine the pre-fetch distance. This allows standard applications and benchmarks to benefit from pre-fetching without requiring any software support. This means that there is no need to modify the software to deal with pre-fetching.

The embodiment also avoids duplicate pre-fetches by being able to refrain from pre-fetching data that is already present in the cache 6. As explained above, each time data at a given address is considered for pre-fetching it is looked up in the cache 6 by checking its Busy bit to ensure it is not already present. In addition the Busy bit is checked to ensure that the cache row chosen to receive the next pre-fetch data is not already busy with another pre-fetch.

To enable the cache 6 to check if a line is already present before issuing the pre-fetch the cache must have a dual ported tag ram. As an alternative it would be possible to steal tag cycles from the CPU 2, however this might either slow down the CPU 2 or prevent the pre-fetch from working when the CPU was busy fetching. Clearly fetch requests must be prioritized over pre-fetch requests since a fetch request is for data that is definitely required by the CPU and the program will stall if this data is not made available to the CPU. Thus if there is no dual-ported tag ram, checking for the presence of pre-fetch data could be done on a clock cycle in which data is not being fetched. In this embodiment a dual ported tag ram is used, but the alternative could be implemented in a particular situation should this be considered appropriate.

Another feature of the cache 6 is that it has a write buffer. When a dirty line is replaced (due to a cache miss) the dirty data is sent into the write buffer. The required data is then fetched from the external memory interface 28 and the write is performed at some later convenient time. The write buffer helps to reduce the cache miss time and thus the number of CPU stall cycles.

To maintain coherency the cache 6 also needs to avoid pre-fetching data that is present in the write buffers. If this data is pre-fetched then there is a danger that read requests will complete before the write buffer is flushed and the wrong data will be returned to the CPU 2. If this condition is detected the pre-fetch triggers a flush of the write buffer and then the data is pre-fetched.

In some cases it is desirable to trigger pre-fetches on write transactions and in other cases it is not. This decision depends on the chosen cache policy. In this embodiment the cache 6 allocates and fills cache lines on a write miss, therefore pre-fetch on write is enabled. Under a different cache policy, that is if write misses do not cause reads to the external memory interface then pre-fetches would only be triggered by read operations.

Another important feature of the embodiment is that there is a limit to the number of outstanding bus requests based on the number of available slots in the tag array 26. In turn, the number of elements in the tag array 26 is based on the number of outstanding pre-fetches required to overcome the bus latency. There is only ever one pre-fetch request that is waiting to be issued, but it is possible to have more than one outstanding pre-fetch. Outstanding pre-fetches are pre-fetch requests that have been issued by pre-fetch issuer 36 and sent to memory 8 but the requested data has not yet been returned. For example if the system has an average request to response latency of 64 cycles the number of outstanding pre-fetches should be equal to the amount of data that could be consumed by the CPU in that period. If a cache line is 32 bytes and the CPU can consume 4 bytes per cycle then it takes 8 cycles to use a full cache line. This embodiment therefore requires up to 64/8==8 outstanding pre-fetches. This is a maximum number and this may not be reached in practice.

The actual number of outstanding pre-fetches at any given time depends on the current speed of obtaining data from memory 8 which in turn depends on factors such as overall congestion of the system 1. However, should the maximum number be attained, the pre-fetch issuer 36 is not permitted to issue any more pre-fetch requests until one of the outstanding ones returns data.

Another feature of the embodiment is the pre-fetch back-off. As described above, when a fetch request is issued, the pre-fetch address is also calculated by adding the pre-fetch distance 'd', thus providing a pre-fetch address to the pre-fetch engine 40. This address is stored by cache controller 38 until a new request is received from the CPU 2. Storing of the last pre-fetch address is important in order to stop the pre-fetch back-off from discarding all issued pre-fetch requests just because resources are not available on that particular cycle. This can be further explained as follows.

In some cases it does not make sense to issue a pre-fetch just because it is possible to do so. For example a demand miss (CPU stalled on cache miss) must be dealt with before issuing any pre-fetches. However, there are other cases whereby a pre-fetch can be issued immediately. In these cases the cache 6 maintains a queue of issued pre-fetch requests (i.e., outstanding pre-fetches) and passes them onto tag array 26 when it is able, for example when external memory interface 28 is idle.

Therefore, as pre-fetching only affects performance and not functionality, in this embodiment the cache 6 is able to discard an issued pre-fetch request that it is unable to send out. The alternative to discarding pre-fetch requests would be to stall the CPU 2, however as the idea of pre-fetching is to increase performance it makes little sense to do so.

Discarding pre-fetch requests when the cache 6 is not able to send them out actually has an additional advantage. If the external memory interface 28 is busy then less pre-fetches will get sent to it and thus the bus loading will reduce. This system of pre-fetching only when resources are available allows the cache 6 to be sensitive to external factors.

In this embodiment, if more than one pre-fetch request is triggered by the method described above, and conditions dictate that there is not capacity to send all of them out to tag array 26, all but one are discarded. Thus one pre-fetch instruction is retained to be carried out when capacity allows. This keeps a balance between stacking a large number of pre-fetch requests for data that may not be needed and discarding all pre-fetch requests when capacity is not currently available (which could subsequently cause a CPU stall). If, on the other hand, conditions dictate that there is capacity to send out pre-fetch requests, the maximum number of outstanding pre-fetches (in this embodiment 8, as calculated above) can be maintained. Thus the number of outstanding pre-fetches is optimized in accordance with system capacity.

The pre-fetch back-off can operate in conjunction with the optimization of pre-fetch distance 'd' described above, or with a different system of pre-fetching.

It will be appreciated that the invention is not limited to the particular embodiment described. For example it would be possible to have one Busy bit per cache line instead of one per row. For a set associative cache this would mean having to perform a tag compare before the line's busy status could be confirmed. In order to perform a tag comparison the tag must be valid. This means that when a pre-fetch is issued its tag has to be in the allocated line. The tag comparison logic would then have to return a tag hit but also note that line is busy and should not be accessed.

The filter 4 may not be present in some systems. The cache 6 could have more than one write buffer. The pre-fetch back-off could always retain a different number of pre-fetches than one. In the calculation of pre-fetch distance 'd', the value of the issued pre-fetch counter could be divided by a different power of 2 or a power of a different number. It is not necessary for a power formula to be used; any way of comparing the two numbers could be used. Also, instead of counting used pre-fetches, pre-fetch requests could be counted. A different specification of used pre-fetch and discarded pre-fetch counters could be used than the 16-bit one used in the embodiment. It would be possible to allow pre-fetching of data to be disabled for a fixed time period and then to set 'd' to one upon re-enablement. It would further be possible not to use a Busy bit but instead to remember outstanding pre-fetches by some other method.

It will also be appreciated that it is not necessary for the cache to be a write back cache. It could alternatively be a write through cache, in which coherency is reinstated on an address by address basis rather than in a whole cache line.

It would be possible to carry out optimization of 'd' during execution of a particular computer program by including code for doing this within the program. Such code would override the optimization procedure described. It would also take account of the requirements of the program at given stages and may therefore result in a more accurate optimization of 'd'. However, the disadvantage of doing this is that the code must be added for each program and hence the method described in the embodiment is more generally applicable and therefore easier and more efficient to implement.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of controlling a cache memory, the method comprising:

issuing fetch requests for accessing data items from locations in a main memory identified by access addresses in a program being executed;

issuing pre-fetch requests for speculatively accessing pre-fetch data items from locations in said main memory identified by addresses which are determined as being a number of locations from respective ones of said access addresses;

selectively varying said number of locations at regular time intervals; and selectively discarding issued pre-fetch requests based on current running capacity of the main memory.

2. The method of claim 1 wherein selectively varying the number of locations at regular time intervals includes:

during a given time interval, counting a first number of pre-fetched data items accessed from a storage area;

during the given time interval, counting a second number of pre-fetched data items not accessed from the storage area and subsequently overwritten by storage of another data item or pre-fetch data item;

calculating a ratio of the second number to the first number;

comparing the calculated ratio to a first value; and if the calculated ratio is more than the first value, decreasing the number of locations, and otherwise increasing the number of locations up to a second value.

3. A system, comprising:

a central processing unit configured to execute a program;

a main memory; and a cache memory arranged between the central processing unit and the main memory, the cache memory including:

a fetch engine arranged to issue fetch requests for accessing data items from locations in a main memory identified by access addresses in the program being executed;

a pre-fetch engine controlled to issue pre-fetch requests for speculatively accessing pre-fetch data items from locations in said main memory identified by addresses which are determined as being a number of locations from respective ones of said access addresses; and a calibrator arranged to selectively vary said number of locations at regular time intervals, wherein the pre-fetch engine is controlled by machine-readable instruction arranged to override the calibrator.

4. The system of claim 3, further comprising a controller to selectively discard issued pre-fetch requests in dependence on current running capacity of the main memory.

5. The system of claim 3 wherein the calibrator includes:

a used pre-fetch counter arranged to, during a given time interval, count a first number of pre-fetched data items accessed from a storage area;

a discarded pre-fetch counter arranged to, during said given time interval, count a second number of pre-fetched data items not accessed from the storage area and subsequently overwritten by storage of another data item or pre-fetch data item;

a ratio calculator coupled to the counters and arranged to calculate a ratio of the second number to the first number;

a comparator coupled to the ratio calculator and arranged to compare the calculated ratio to a first value; and an optimizer arranged to, if the calculated ratio is more than the first value, decrease the number of locations, and otherwise to increase the number of locations up to a second value.

6. An apparatus, comprising:

a fetch engine arranged to issue fetch requests to access data items from locations in a memory identified by access addresses in a program being executed;

a pre-fetch engine controlled to issue pre-fetch requests to speculatively access pre-fetch data items from locations in said memory identified by addresses which are determined as being a number of locations from respective ones of said access addresses;

a calibrator arranged to selectively vary said number of locations at regular time intervals; and a storage device having an accessible storage area to hold data items and pre-fetch data items, wherein the calibrator includes:

a used pre-fetch counter arranged to, during a given time interval, count a first number of pre-fetched data items accessed from the accessible storage area of the storage device;

a discarded pre-fetch counter arranged to, during said given time interval, count a second number of pre-fetched data items not accessed from the accessible storage area and subsequently overwritten by storage of another data item or pre-fetch data item;

a ratio calculator arranged to calculate the ratio of the second number to the first number;

a comparator arranged to compare the calculated ratio to a first value; and an optimizer arranged to, if the calculated ratio is more than the first value, decrease the number of locations, and otherwise to increase the number of locations up to a second value.

7. The apparatus of claim 6 wherein said second value is a number of issued fetch requests that have not returned from the memory.

8. The apparatus of claim 6 wherein if the calculated ratio is more than an upper limit, the optimizer is arranged to set the number of locations to one.

9. An apparatus, comprising a fetch engine arranged to issue fetch requests to access data items from locations in a memory identified by access addresses in a program being executed;

a pre-fetch engine controlled to issue pre-fetch requests to speculatively access pre-fetch data items from locations in said memory identified by addresses which are determined as being a number of locations from respective ones of said access addresses;

a calibrator arranged to selectively vary said number of locations at regular time intervals; and a set associative cache having N rows, wherein before a pre-fetch data item is accessed from the memory, a busy bit is set for a row, to prevent that row from being used to store any other pre-fetch data items, and wherein if the pre-fetched data item has been accessed, that data item is stored in that row and the busy bit is re-set.

10. The apparatus of claim 9, further comprising a controller arranged to selectively discard issued pre-fetch requests.

11. The apparatus of claim 9, further comprising a busy bit for each row to indicate whether each respective row is occupied with a pre-fetched data item.

12. An apparatus, comprising:

a fetch engine arranged to issue fetch requests to access data items from locations in a memory identified by access addresses in a program being executed;

a pre-fetch engine controlled to issue pre-fetch requests to speculatively access pre-fetch data items from locations in said memory identified by addresses which are determined as being a number of locations from respective ones of said access addresses;

a calibrator arranged to selectively vary said number of locations at regular time intervals;

a storage device having an accessible storage area to hold data items and pre-fetch data items; and a tag array to receive pre-fetch requests, the tag array having a plurality of sections and being arranged to allocate a section to each said pre-fetch request before each request is forwarded to the memory.

13. The apparatus of claim 12 wherein the pre-fetch engine is controlled by a computer program arranged to override the calibrator.

14. The apparatus of claim 12 wherein each allocated section includes a tag to indicate an address in the accessible area of the storage device in which the data item being accessed from the memory in accordance with each pre-fetch request is to be stored, a transaction ID, and a flag associated with the pre-fetch data item.

15. The apparatus of claim 14 wherein if said data item is accessed from the storage device, said flag is re-set and a signal is sent to the used pre-fetch counter to cause it to increment.

16. An apparatus, comprising:

a fetch engine arranged to issue fetch requests to access data items from locations in a memory identified by access addresses in a program being executed;

a pre-fetch engine controlled to issue pre-fetch requests to speculatively access pre-fetch data items from locations in said memory identified by addresses which are determined as being a number of locations from respective ones of said access addresses; and a calibrator arranged to selectively vary said number of locations at regular time intervals, wherein the pre-fetch engine is controlled by machine-readable instructions arranged to override the calibrator.

17. A apparatus according to claim 16, further comprising a storage device having an accessible storage area for holding data items and pre-fetch data items, and wherein the cache memory is arranged to store said data items and pre-fetch data items in the accessible storage area of the storage device.

18. An apparatus according to claim 17 wherein the calibrator comprises:

a used pre-fetch counter arranged to, during a given time interval, count a first number of pre-fetched data items accessed from the accessible storage area of the storage device;

a discarded pre-fetch counter arranged to, during said given time interval, count a second number of pre-fetched data items not accessed from the accessible storage area and subsequently overwritten by storage of another data item or pre-fetch data item;

a ratio calculator arranged to calculate the ratio of the second number to the first number;

a comparator arranged to compare the calculated ratio to a predetermined value; and an optimizer arranged to, if the calculated ratio is more than the pre-determined value, decrease the number of locations, and otherwise to increase the number of locations up to a pre-determined maximum value.

19. An apparatus according to claim 18 wherein said pre-determined maximum value is the number of issued fetch requests that have not returned from the main memory.

20. An apparatus according to claim 18 wherein if the calculated ratio is more than a pre-determined upper limit, the optimizer is arranged to set the number of locations to one.

21. An apparatus according to claim 17 wherein the pre-fetch engine is further controlled not to access any data items that are already present in the storage device.

22. An apparatus according to claim 17, further comprising a tag array that receives pre-fetch requests, the tag array having a plurality of sections and being arranged to allocate a section to each said pre-fetch request before forwarding the request to the main memory.

23. An apparatus according to claim 22 wherein the allocated section comprises a tag indicating the address in the accessible area of the storage device in which the data item being accessed from the main memory in accordance with each pre-fetch request is to be stored, a transaction ID, and a flag associated with the pre-fetch data item.

24. An apparatus according to claim 23 wherein when the pre-fetch data item has been accessed from the main memory, it passes to the tag array, wherein its transaction ID is looked up to point to its tag, and wherein it is stored together with said flag in the address indicated by the tag, so that the storage device knows that it is a pre-fetch data item.

25. An apparatus according to claim 24 wherein when said data item is accessed from the storage device, said flag is re-set and a signal is sent to a used pre-fetch counter to cause it to increment.

26. An apparatus according to claim 25, wherein if said data item is not accessed from the storage device and is subsequently overwritten by storage of another data item or pre-fetch data item, the status of said flag is checked and if it is found to be set, a signal is sent to a discarded pre-fetch counter to cause it to increment.

27. An apparatus according to claim 16, further comprising a write buffer for holding data items and wherein the pre-fetch engine is controlled not to pre-fetch a data item that is present in the write buffer.

28. An apparatus of claim 16 wherein the cache memory comprises a set associative cache having N rows.

29. An apparatus according to claim 28, further comprising a busy bit for each row for indicating whether or not the row is occupied with a pre-fetched data item.

30. An apparatus according to claim 28 wherein the cache memory is arranged to, before a pre-fetch data item is accessed from the main memory, set a busy bit for a row, thus preventing that row from being used to store any other pre-fetch data items, and when the pre-fetched data item has been accessed, to store it in that row and to re-set the busy bit.

31. The apparatus of claim 16, further comprising a controller arranged to selectively discard issued pre-fetch requests.

32. The apparatus of claim 31 wherein the controller selectively discards issued pre-fetch requests in dependence on current running capacity of the memory.

33. An apparatus, comprising:

a pre-fetch issuer arranged to issue pre-fetch requests;

a controller arranged to selectively discard issued pre-fetch requests; and a pre-fetch engine arranged to access pre-fetch data items at locations in a memory in accordance with issued pre-fetch requests that have not been discarded, wherein the controller is arranged to selectively discard issued pre-fetch requests in dependence on current running capacity of the memory.

34. The apparatus of claim 33, further comprising a storage device having an accessible storage area to hold data items and pre-fetch data items.

35. A system, comprising:

a memory; and a memory device coupled for communication with the memory, the memory device including:

a pre-fetch issuer arranged to issue pre-fetch requests;

a controller arranged to selectively discard issued pre-fetch requests; and a pre-fetch engine arranged to access pre-fetch data items at locations in the memory in accordance with issued pre-fetch requests that have not been discarded, wherein the controller is arranged to selectively discard issued pre-fetch requests in dependence on current running capacity of the memory.

36. The system of claim 35, further comprising a buffer to hold data items and wherein the pre-fetch engine is controlled to not pre-fetch a data item that is present in the buffer.

* * * * *